(12) United States Patent
Yang

(10) Patent No.: US 10,534,946 B2
(45) Date of Patent: *Jan. 14, 2020

(54) TWO-DIMENSIONAL CODE PROCESSING METHOD AND APPARATUS

(71) Applicant: Alibaba Group Holding Limited, George Town (KY)

(72) Inventor: Chenghai Yang, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/249,267

(22) Filed: Jan. 16, 2019

(65) Prior Publication Data

US 2019/0147208 A1 May 16, 2019

Related U.S. Application Data

(63) Continuation of application No. 15/949,338, filed on Apr. 10, 2018, now Pat. No. 10,223,566, which is a
(Continued)

(30) Foreign Application Priority Data

Oct. 28, 2015 (CN) .......................... 2015 1 0714082

(51) Int. Cl.
*G06K 7/10* (2006.01)
*H04L 29/06* (2006.01)
(Continued)

(52) U.S. Cl.
CPC ....... *G06K 7/10881* (2013.01); *G06K 7/1417* (2013.01); *G06K 19/06037* (2013.01); *H04L 29/06* (2013.01); *G06K 2007/10524* (2013.01)

(58) Field of Classification Search
None
See application file for complete search history.

(56) References Cited

U.S. PATENT DOCUMENTS 10,223,566 B2 * 3/2019 Yang ........................ H04L 29/06
2009/0001173 A1 1/2009 Sevier et al.
(Continued)

FOREIGN PATENT DOCUMENTS

| CN | 1777101 | 5/2006 |
|----|---------|--------|
| CN | 201444381 | 4/2010 |

(Continued)

OTHER PUBLICATIONS

International Search Report issued by the International Searching Authority in International Application No. PCT/CN2016/102541 dated Jan. 13, 2017; 8 pages.
(Continued)

*Primary Examiner* — Kristy A Haupt
(74) *Attorney, Agent, or Firm* — Fish & Richardson P.C.

(57) ABSTRACT

A two-dimensional code generation request is received by a server from a two-dimensional code display client. Static, two-dimensional code information and a random feature value are generated by the server. The generated static, two-dimensional code information and the random feature value are sent by the server to the two-dimensional code display client to display a combinational, two-dimensional code on the two-dimensional code display client. A two-dimensional code verification request sent by a two-dimensional code scanning client is received by the server. A two-dimensional code scanning status value is sent by the server to the two-dimensional code scanning client.

20 Claims, 11 Drawing Sheets

Related U.S. Application Data continuation of application No. PCT/CN2016/102541, filed on Oct. 19, 2016.

(51) Int. Cl.
*G06K 7/14* (2006.01)
*G06K 19/06* (2006.01)

(56) References Cited

U.S. PATENT DOCUMENTS

| | | |
|---|---|---|
| 2015/0088674 A1 | 3/2015 | Flurscheim et al. |
| 2018/0101914 A1 | 4/2018 | Samuel et al. |

FOREIGN PATENT DOCUMENTS

| | | |
|---|---|---|
| CN | 102185839 | 9/2011 |
| CN | 102542460 | 7/2012 |
| CN | 102842081 | 12/2012 |
| CN | 202650046 | 1/2013 |
| CN | 203299860 | 11/2013 |
| CN | 103886352 | 6/2014 |
| CN | 103927464 | 7/2014 |
| CN | 104281864 | 1/2015 |
| CN | 104966114 | 10/2015 |
| CN | 106789875 | 5/2017 |
| CN | 107480990 | 12/2017 |
| TW | 201812674 | 4/2018 |

OTHER PUBLICATIONS

Extended European Search Report issued in EP 16858941.4 dated Sep. 13, 2018; 6 pages.

\* cited by examiner

__(1)__

TWO-DIMENSIONAL CODE PROCESSING METHOD AND APPARATUS

This application is a continuation of U.S. patent application Ser. No. 15/949,338, filed on Apr. 10, 2018, which is a continuation of PCT Application No. PCT/CN2016/102541, filed on Oct. 19, 2016, which claims priority to Chinese Patent Application No. 201510714082.0, filed on Oct. 28, 2015, and each application is hereby incorporated by reference in its entirety.

TECHNICAL FIELD

The present application relates to network technologies, and in particular, to a two-dimensional code processing method and apparatus.

BACKGROUND

With the development of Internet technologies, people's life becomes increasingly convenient. For example, two-dimensional codes are more widely used in various fields. A two-dimensional code records data symbol information by using a particular type of geometric graphs distributed on a black and white plane based on a particular rule. It has features such as a large information capacity. A code scanning client can be used to obtain the information in the two-dimensional code by parsing and to perform some application processing based on the received information. However, current two-dimensional codes are usually static two-dimensional codes. Such static two-dimensional codes can be easily copied or photographed, resulting in a leakage of information included in the two-dimensional code. Consequently, the leaked information may be illegally used to cause losses to the code owner.

SUMMARY

A main object of the present application is to provide a two-dimensional code processing method and device to improve the security of implementing a two-dimensional code.

Specifically, the present application is implemented by using the following technical solutions:

According to a first aspect, a two-dimensional code processing method is provided, including: when receiving a two-dimensional code generation request sent by a two-dimensional code display client, generating static two-dimensional code information based on a user identifier carried in the two-dimensional code generation request; generating a random feature value, where the random feature value is used to limit a display feature of dynamic feature information displayed by the two-dimensional code display client; and sending the static two-dimensional code information and the random feature value to the two-dimensional code display client, so that the two-dimensional code display client displays a combinational two-dimensional code, and the displayed combinational two-dimensional code includes the static two-dimensional code information and the dynamic feature information displayed based on the random feature value.

According to a second aspect, a two-dimensional code processing method is provided, including: sending a two-dimensional code generation request to a server, where the two-dimensional code generation request carries a user identifier; receiving a combinational two-dimensional code returned by the server, where the combinational two-dimensional code includes a random feature value generated by the server and static two-dimensional code information generated by the server based on the user identifier; and generating dynamic feature information based on the random feature value, combining the dynamic feature information and a static two-dimensional code to form a combinational two-dimensional code for displaying.

According to a third aspect, a two-dimensional code processing method is provided, including: scanning a combinational two-dimensional code displayed on a two-dimensional code display client, where the combinational two-dimensional code includes dynamic feature information and static two-dimensional code information that is generated based on a user identifier of the two-dimensional code display client; parsing the combinational two-dimensional code to obtain the static two-dimensional code information, and obtaining a random feature value based on the dynamic feature information; and sending the random feature value and the static two-dimensional code information to a server to request the server to verify the random feature value.

According to a fourth aspect, a two-dimensional code processing apparatus is provided, including: a first generation module, configured to: when a two-dimensional code generation request sent by a two-dimensional code display client is received, generate static two-dimensional code information based on a user identifier carried in the two-dimensional code generation request, where the two-dimensional code generation request is sent by a two-dimensional code display client; a second generation module, configured to generate a random feature value, where the random feature value is used to limit a display feature of dynamic feature information displayed by the two-dimensional code display client; and an information sending module, configured to send the static two-dimensional code information and the random feature value to the two-dimensional code display client, so that the two-dimensional code display client displays a combinational two-dimensional code, and the displayed combinational two-dimensional code includes the static two-dimensional code information and the dynamic feature information displayed based on the random feature value.

According to a fifth aspect, a two-dimensional code processing apparatus is provided, including: a request sending module, configured to send a two-dimensional code generation request to a server, where the two-dimensional code generation request carries a user identifier; an information receiving module, configured to receive a combinational two-dimensional code returned by the server, where the combinational two-dimensional code includes a random feature value generated by the server and static two-dimensional code information generated by the server based on the user identifier; and a combination and display module, configured to generate dynamic feature information based on the random feature value, and combine the dynamic feature information and a static two-dimensional code to form a combinational two-dimensional code for displaying.

According to a sixth aspect, a two-dimensional code processing apparatus is provided, including: a two-dimensional code scanning module, configured to scan a combinational two-dimensional code displayed on a two-dimensional code display client, where the combinational two-dimensional code includes dynamic feature information and static two-dimensional code information that is generated based on a user identifier of the two-dimensional code display client; a two-dimensional code parsing module, configured to parse the combinational two-dimensional code to obtain the static two-dimensional code information, and obtain a random feature value based on the dynamic feature information; and a two-dimensional code verification module, configured to send the random feature value and the static two-dimensional code information to a server and request the server to verify the random feature value.

In the present application, a combinational two-dimensional code that includes the static two-dimensional code information and the dynamic feature information is generated, and two-dimensional code verification is performed based on the random feature value corresponding to the combinational two-dimensional code. The disclosed method and apparatus can make copying the two-dimensional code more difficult, so as to enhance security of using the two-dimensional code.

DESCRIPTION OF EMBODIMENTS

Example embodiments are described in detail herein, and examples of the example embodiments are presented in the accompanying drawings. When the following description relates to the accompanying drawings, same numbers in different accompanying drawings represent a same or similar element unless specified otherwise. Implementations described in the following example embodiments do not represent all implementations consistent with the present application. Instead, they are only examples of apparatuses and methods that are described in the claims in detail and that are consistent with some aspects of the present application.

Two-dimensional codes have been widely used in people's daily life. A two-dimensional code can carry a relatively large amount of information, and the information in the two-dimensional code can be obtained by scanning and parsing the two-dimensional code. For example, a two-dimensional code can be used for payment transactions. When making a payment, a payer requests a server to generate a two-dimensional code. The two-dimensional code can include identification information of the payer. A payee obtains a payer identifier (ID) in the two-dimensional code by scanning the code and submits the payer ID to the server to request the money paid from the payer account that corresponds to the payer ID.

The two-dimensional codes currently used are usually static two-dimensional codes. Static two-dimensional codes are easy to be copied or photographed, resulting in leaking of information included in the static two-dimensional code. For example, when using the two-dimensional code for payment, the payer ID can be easily obtained by scanning the two-dimensional code. If a payer sets password-free authorization for small amount payment, the payee can request the server to deduct money from the payer's account once the information contained in the two-dimensional code is obtained. If an offender obtains information about the payer through copying or photographing the two-dimensional code, because of the password-free payment authorization, the offender can also easily request the server to deduct money from the payer's account, which can cause a fund loss to the payer. To overcome the security risk associated with the static two-dimensional code and improve security of applying the two-dimensional code, the present application provides a two-dimensional code processing method. The two-dimensional code generated in this method is not a static two-dimensional code but a more secured combinational two-dimensional code. Details are described below.

Figure 1:
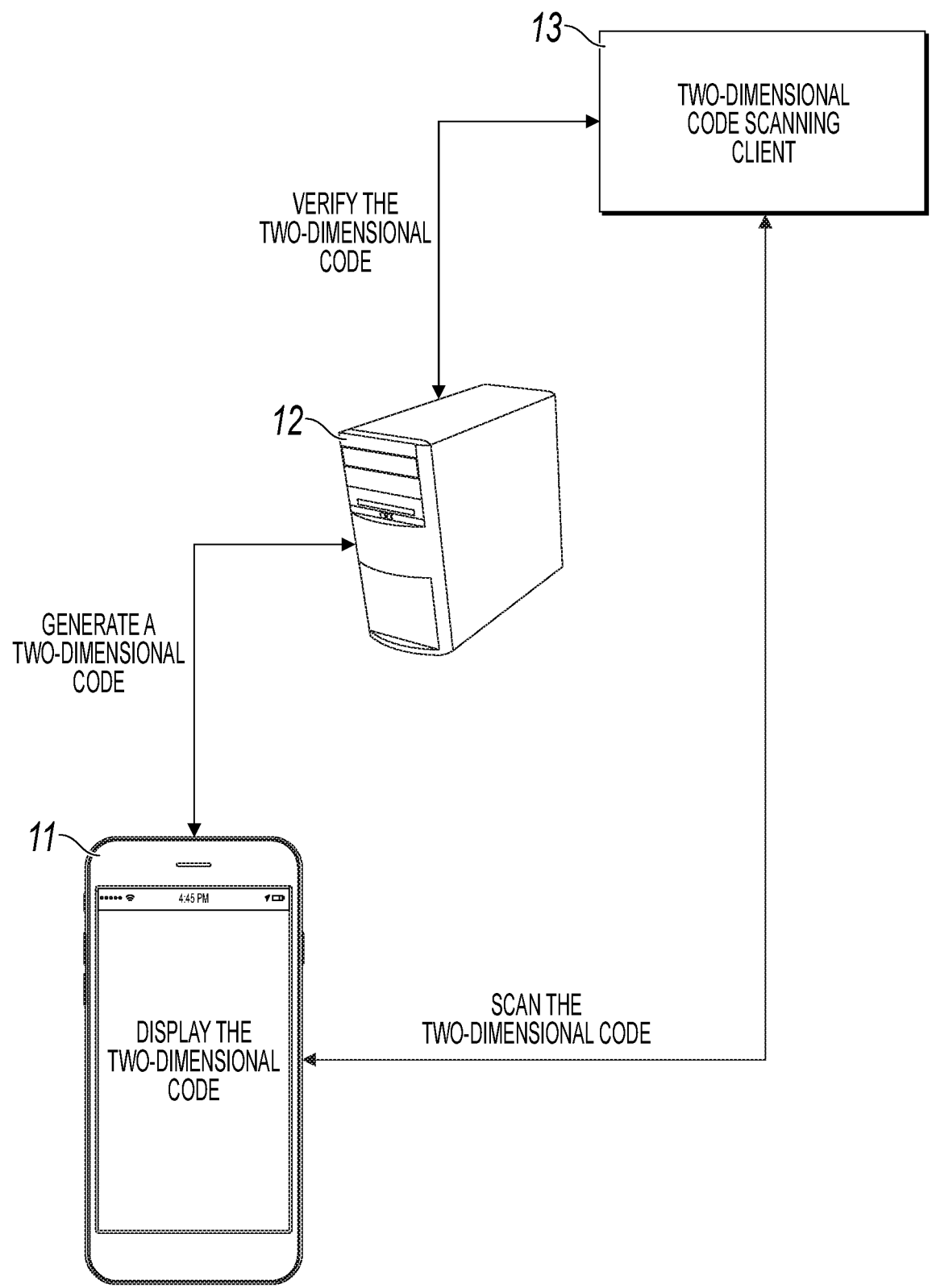
FIG. 1 is a schematic diagram illustrating an example of a system for two-dimensional code processing, according to an embodiment of the present application.

FIG. 1 is a schematic diagram illustrating an example of a system for two-dimensional code processing, according to an embodiment of the present application. When a two-dimensional code is applied, three devices can be used. As shown in FIG. 1, the application system includes the following devices:

Two-dimensional code display client 11: For example, the display client can be a user's smartphone or an application (APP) on the smartphone, and the two-dimensional code display client can be configured to display a combinational two-dimensional code according to the present application.

Server 12: the server 12 can generate information that is used to display the combinational two-dimensional code, that is, the information of the combinational two-dimensional code can be generated by the server 12. The server 12 can transmit the information to the two-dimensional code display client 11, such that the two-dimensional code display client 11 can display the combinational two-dimensional code based on the information. The server 12 can also be configured to verify the combinational two-dimensional code, as illustrated in the following embodiments.

Two-dimensional code scanning client 13: the two-dimensional code scanning client 13 can be, for example, a device such as a code scanner or a camera that can scan a two-dimensional code or an APP installed on the device. The two-dimensional code scanning client 13 can be configured to scan the combinational two-dimensional code displayed on the two-dimensional code display client 11, and parse the combinational two-dimensional code to obtain two-dimensional code information included in the combinational two-dimensional code. In addition, the two-dimensional code scanning client 13 can further request the server 12 to perform two-dimensional code verification. The server 12 returns a code scanning success or failure message to the two-dimensional code scanning client 13. If the code scanning succeeds, the server can use the two-dimensional code normally (for example, proceed to money withdrawal). If a code scanning fails, applying the information in the combinational two-dimensional code may be stopped (for example, stop money withdrawal).

Figure 2:
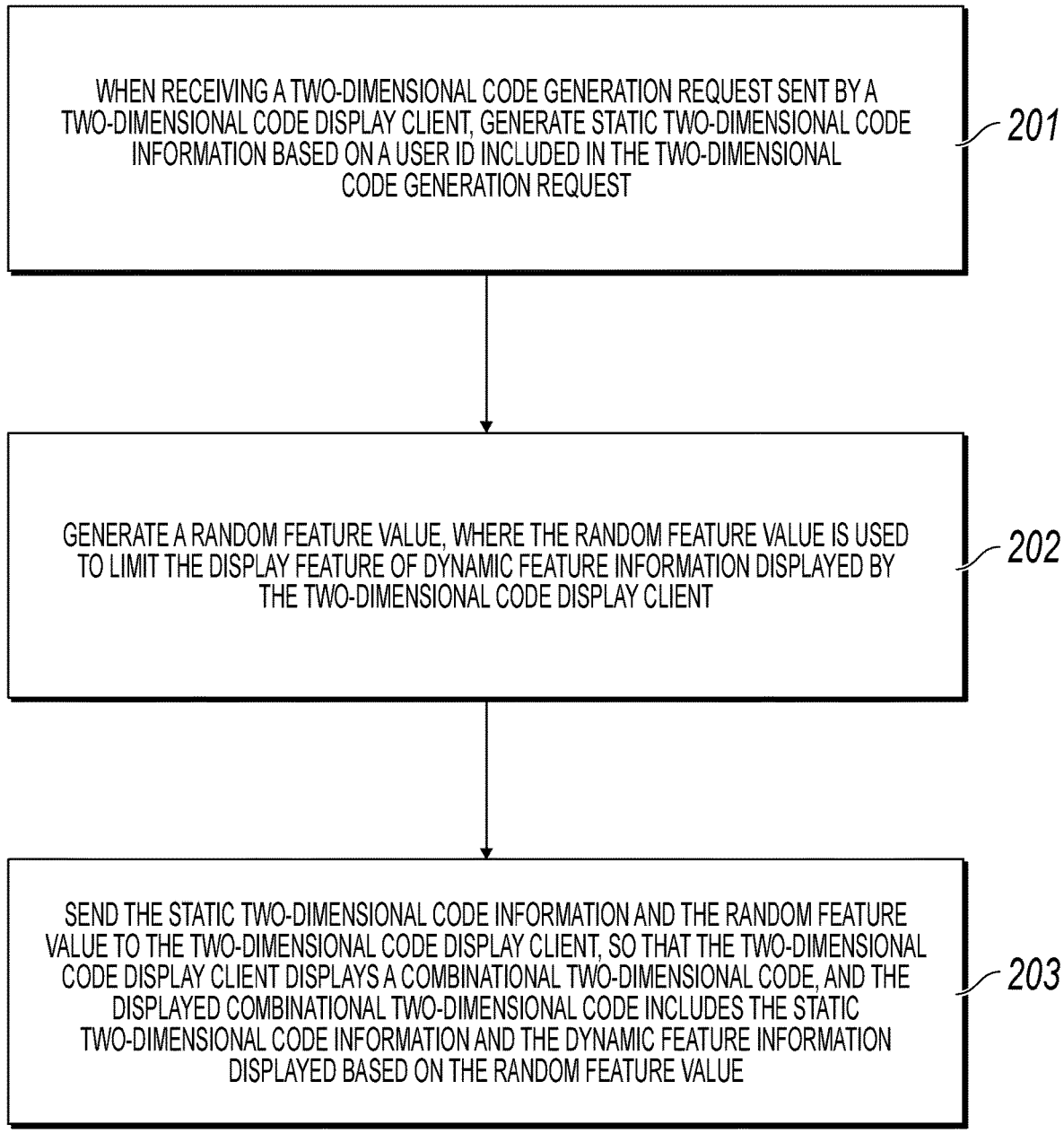
FIG. 2 is a flowchart illustrating an example of a two-dimensional code processing method, according to an embodiment of the present application.

FIG. 2 is a flowchart illustrating an example of a two-dimensional code processing method, according to an embodiment of the present application. The method can include the following steps.

Step 201: When receiving a two-dimensional code generation request sent by a two-dimensional code display client, generate static two-dimensional code information based on a user ID included in the two-dimensional code generation request.

For example, when receiving a two-dimensional code generation request sent by a two-dimensional code display client 11, a server 12 can generate static two-dimensional code information in this step. The static two-dimensional code information can be two-dimensional code information generated in a conventional method. For example, the two-dimensional code display client 11 can carry a user ID (for example, a user account) when sending the two-dimensional code generation request. The server 12 can generate, based on the user ID, a piece of static two-dimensional code information that can be used to uniquely identify the user that corresponds to the user ID.

Step 202: Generate a random feature value, where the random feature value is used to limit the display feature of dynamic feature information displayed by the two-dimensional code display client.

For example, step 202 and step 201 are two parallel processing steps, and can be performed simultaneously or sequentially. In this example, a two-dimensional code displayed by the two-dimensional code display client 11 is a "combinational two-dimensional code". The combinational two-dimensional code includes not only static two-dimensional code information but also dynamic feature information. Obtaining information in the combinational two-dimensional code through copying or photographing can be prevented, by using the dynamic feature information.

For example, the dynamic feature information can include: a dynamically played video or audio, or a series of dynamically played images, etc.; and, in short, can be information that changes with time. The random feature value generated in this step is used to limit the display feature of the dynamic feature information. For example, the display feature can include: a playable frame rate of a video, a playable audio of a music file, etc. The corresponding dynamic feature information is the video or the audio.

In this step, the feature value used to limit the display feature is randomly generated by the server. For example, the server can generate a random number by using a random algorithm. The random number can then be used as the random feature value, for example, the generated random number can be used as the playable frame rate of the video.

Step 203: Send the static two-dimensional code information and the random feature value to the two-dimensional code display client, so that the two-dimensional code display client displays a combinational two-dimensional code, and the displayed combinational two-dimensional code includes the static two-dimensional code information and the dynamic feature information displayed based on the random feature value.

For example, the server can integrate the static two-dimensional code information generated in step 201 and the random feature value generated in step 202 into a two-dimensional code information string, and send the two-dimensional code information string to the two-dimensional code display client, so the two-dimensional code display client can display the combinational two-dimensional code based on the two-dimensional code information string.

Figure 3:
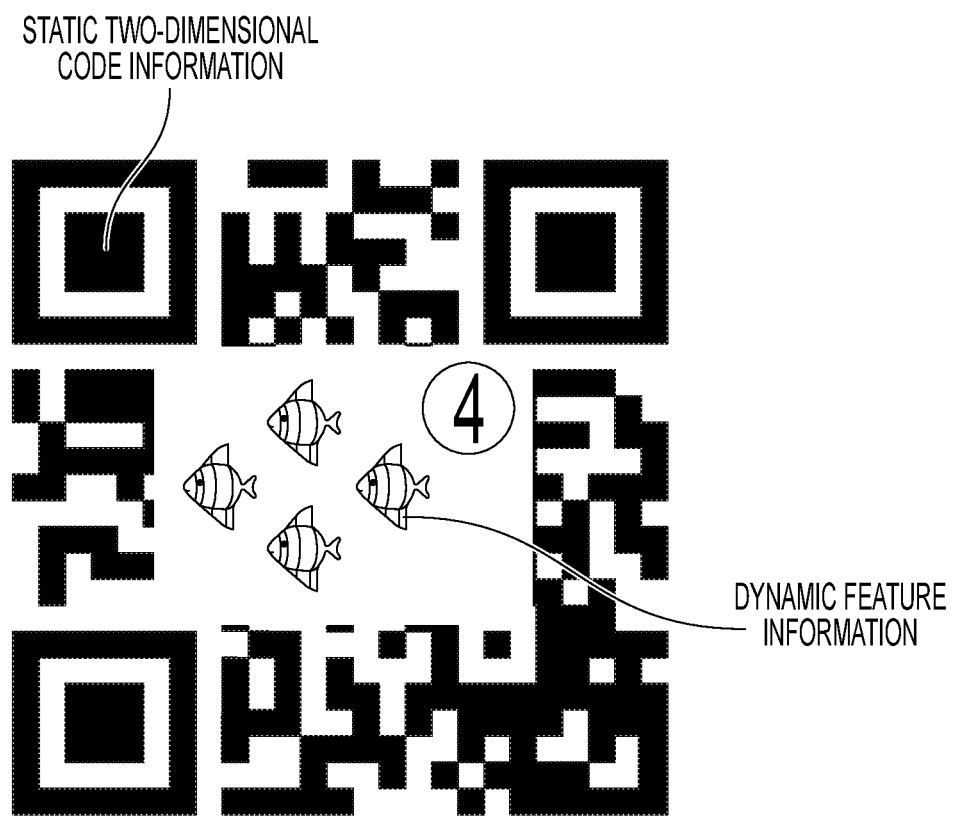
FIG. 3 is a schematic diagram illustrating an example of displaying a combinational two-dimensional code according to an embodiment of the present application.

FIG. 3 is a schematic diagram illustrating an example of displaying a combinational two-dimensional code according to an embodiment of the present application. As shown in FIG. 3, the outer part of the combinational two-dimensional code is a regular two-dimensional code and includes static two-dimensional code information for identifying a user identity. The middle part of the combinational two-dimensional code includes dynamic feature information that is displayed by the two-dimensional code display client based on the random feature value obtained by the server. In the example shown in FIG. 3, the dynamic feature information is a video displayed based on a random frame rate sent by the server.

Alternatively, the combinational two-dimensional code can be in other forms. For example, the video can be displayed at the corner of the combinational two-dimensional code, instead of being in the center of the combinational two-dimensional code. As another example, the combinational two-dimensional code can include two dynamically displayed videos. One displayed at a left corner, and the other displayed at a right corner. The frame rates used by the two videos can be the same or different. Both frame rates can be generated by the client server and sent to the two-dimensional code display client. As yet another example, the combinational two-dimensional code can be in a form of a combination of static two-dimensional code information and music playback. The music can be an audio that is randomly generated by the server. In this case, the two-dimensional code scanning client needs to collect the music. Other examples are not further described in detail.

In this embodiment, the server generates the static two-dimensional code information and the random feature value, so the two-dimensional code display client can display the combinational two-dimensional code based on such information. Thus, the security of the combinational two-dimensional code can be improved, and the two-dimensional code information leakage caused by methods such as copying or photographing can be prevented.

Figure 4:
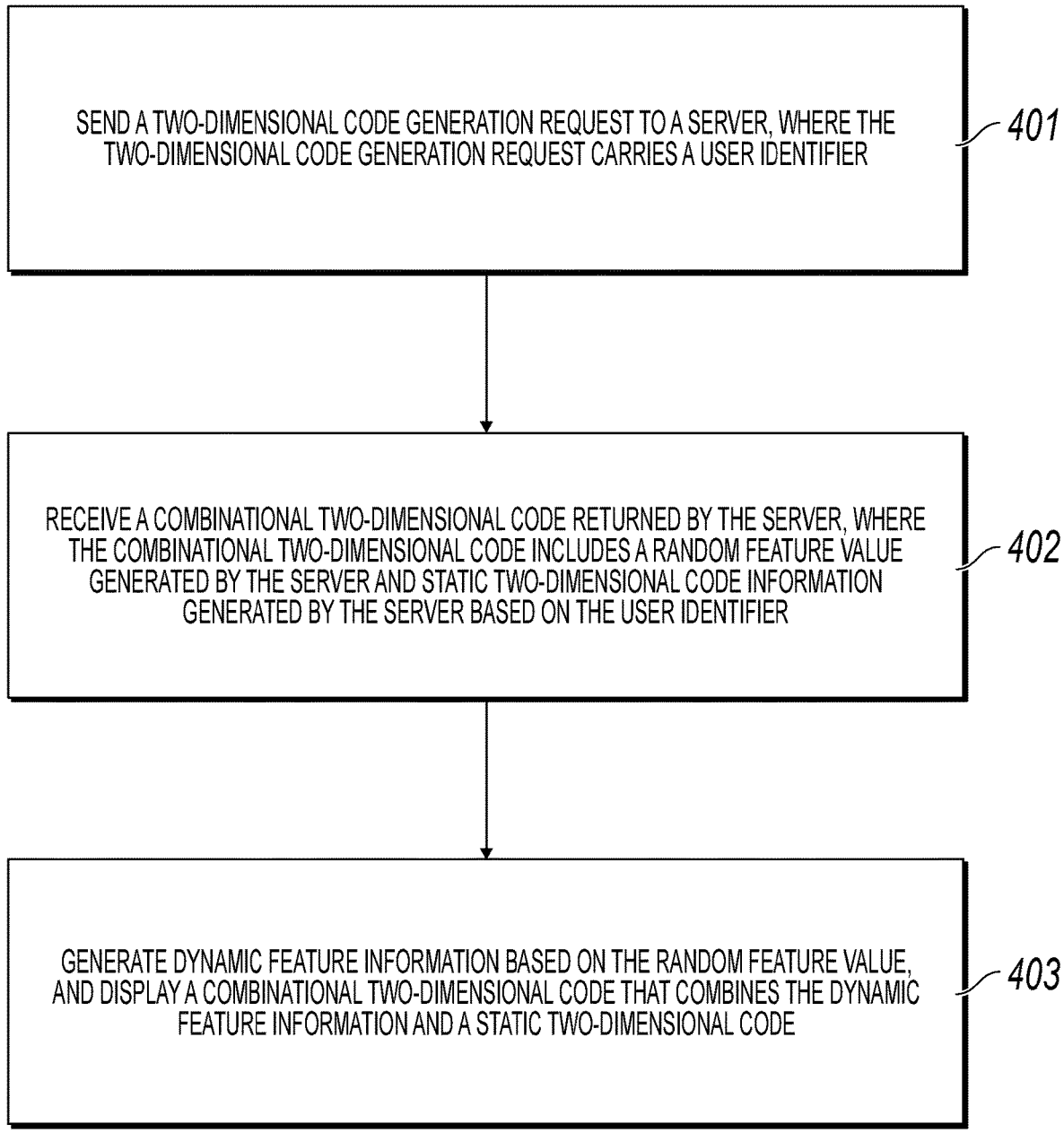
FIG. 4 is a flowchart illustrating another example of a two-dimensional code processing method, according to an embodiment of the present application.

FIG. 4 is a flowchart illustrating another example of a two-dimensional code processing method, according to an embodiment of the present application. As shown in FIG. 4, the method can include the following steps.

Step 401: Send a two-dimensional code generation request to a server, where the two-dimensional code generation request carries a user identifier.

For example, the two-dimensional code display client can be client software (for example, payment software) on a user's smartphone. The user can place a purchase order by using the display client. When the user is ready to pay for a selected product, the user, as a payer, can tap a "generate a two-dimensional code" option on the display client. Then the display client can send a two-dimensional code generation request to the server. The request can carry a user identifier (for example, a user account), which can be used by the user to log in to the display client.

Step 402: Receive a combinational two-dimensional code returned by the server, where the combinational two-dimensional code includes a random feature value generated by the server and static two-dimensional code information generated by the server based on the user identifier.

Step 403: Generate dynamic feature information based on the random feature value, and display a combinational two-dimensional code that combines the dynamic feature information and a static two-dimensional code.

For example, in this step, the two-dimensional code display client can parse the combinational two-dimensional code to obtain the random feature value and the static two-dimensional code information that are received at step 402 transmitted by the server. In addition, in case that the random feature value is a video frame rate, the two-dimensional code display client can locally cache a video, and adjust the frame rate of the video by using the random video frame rate, to generate a video displayed at the frame rate sent by the server. The two-dimensional code display client combines the adjusted video and the static two-dimensional code information for displaying, as shown in FIG. 3. Alternatively, the video can be delivered by the server, and the frequency of the video is the random feature value.

In this embodiment, the two-dimensional code display client displays the combinational two-dimensional code based on the information generated by the server, and the combinational two-dimensional code includes the dynamic feature information. Thus the security of the combinational two-dimensional code is improved, and two-dimensional code information leakage caused by copying or photographing can be prevented accordingly.

Figure 5:
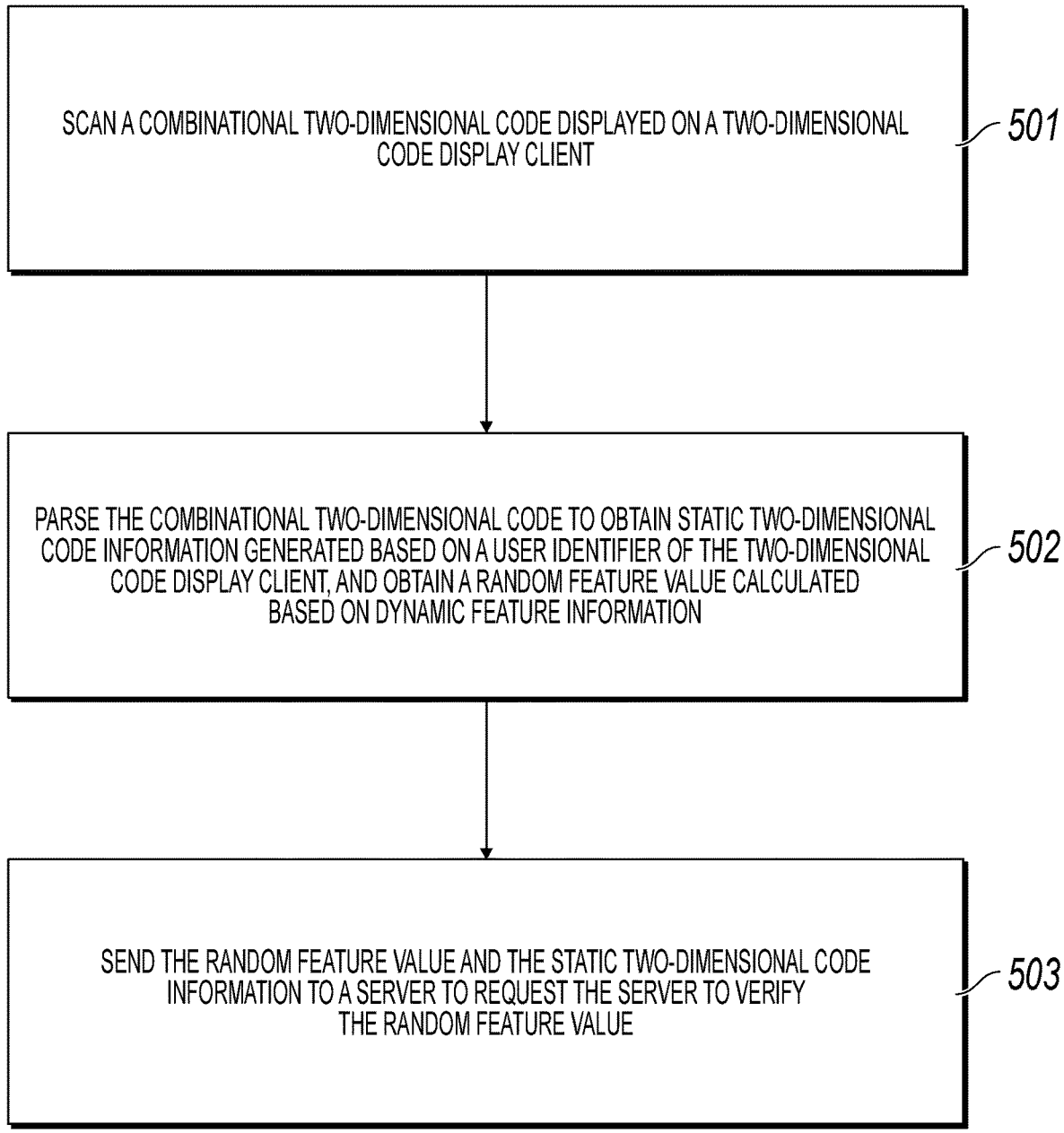
FIG. 5 is a flowchart illustrating yet another example of a two-dimensional code processing method, according to an example embodiment of the present application.

FIG. 5 is a flowchart illustrating yet another example of a two-dimensional code processing method, according to an example embodiment of the present application. As shown in FIG. 5, the method can include the following steps.

Step 501: Scan a combinational two-dimensional code displayed on a two-dimensional code display client.

For example, a code scanning operation of the two-dimensional code scanning client in this step is used to obtain static two-dimensional code information and information that can be used to obtain a random feature value based on dynamic feature information.

For example, if the dynamic feature information in the combinational two-dimensional code is a video displayed at a frame rate indicated by a server, the code scanning client needs to scan the combinational two-dimensional code twice to obtain two video frame images and their corresponding times, so as to calculate a frame rate in a subsequent step. If the dynamic feature information in the combinational two-dimensional code is a music file played based on an audio indicated by the server, in this step, the code scanning client needs to collect music files with proper playing time. So an audio can be calculated in subsequent steps.

Step 502: Parse the combinational two-dimensional code to obtain static two-dimensional code information generated based on a user identifier of the two-dimensional code display client, and obtain a random feature value calculated based on dynamic feature information.

For example, in this step, the code scanning client is configured to calculate, based on the information collected in step 501, the random feature value that corresponds to the dynamic feature information in the combinational two-dimensional code.

If the dynamic feature information is a video, the two-dimensional code scanning client can obtain the random feature value by scanning the combinational two-dimensional code and performing calculation based on the dynamic feature information in the combinational two-dimensional code. For example, the information obtained by scanning the combinational two-dimensional code in step 501 can include two video frame images and corresponding times. In this case, the code scanning client can calculate, based on the information, the quantity of video frame images played in the aforementioned time range. As such, a video frame rate by means of calculation can be obtained. The video frame rate is the random feature value that corresponds to the dynamic feature information obtained by scanning the combinational two-dimensional code by the code scanning client.

Step 503: Send the random feature value and the static two-dimensional code information to a server to request the server to verify the random feature value.

For example, after obtaining the random feature value, the two-dimensional code scanning client can send the random feature value and the static two-dimensional code information to the server to request the server to verify the random feature value. The server is mainly configured to verify whether the random feature value is a random feature value generated and allocated by the server. The server can identify, based on the static two-dimensional code information reported by the two-dimensional code scanning client in this step, a random feature value that corresponds to the static two-dimensional code information; and determine, by comparison, whether the random feature value corresponds to the static two-dimensional code information is the same as the random feature value obtained by performing calculation based on the dynamic feature information in step 502. If they are the same, the verification performed by the server succeeds, and the server can return a code scanning success notification to the two-dimensional code scanning client.

It is worthwhile to note that when using the combinational two-dimensional code, the static two-dimensional code information may be mainly used. For example, when using two-dimensional code for payment, the static two-dimensional code information in the combinational two-dimensional code displayed on the payer's two-dimensional code display client can be information used to identify the payer's identity. After a payee scans the two-dimensional code using the two-dimensional code scanning client, and transmits the scanned static two-dimensional code information to the server, the server can obtain payment information (for example, a payment account) of the payer based on the static two-dimensional code information, and perform a money deduction operation. In the present application, the dynamic feature information included in the combinational two-dimensional code is mainly used to verify whether the scanned static two-dimensional code information obtained by code scanning client can be used, so as to prevent illegal use.

For example, a function of the dynamic feature information is further described. After an illegal user copied or photographed the combinational two-dimensional code, and obtained the static two-dimensional code information by parsing a copied or photographed combinational two-dimensional code, the user needs to request the server to deduct money based on the static two-dimensional code information. The copied or photographed combinational two-dimensional code can be a static two-dimensional code image that corresponds to a single time point. For a video played at a specific frame rate in the combinational two-dimensional code, the illegal user can only obtain a video frame image at a specific time point through copying or photographing. The code scanning client cannot obtain the calculated frame rate merely based on this single image. Therefore, the code scanning client cannot report the video frame rate in the combinational two-dimensional code to the server at the same time. Even if the code scanning client reports a randomly generated video frame rate, the randomly generated video frame rate may not be verified by the server, and cannot be consistent with the video frame rate of the combinational two-dimensional code that is stored in the server. In this case, if the randomly generated video frame rate cannot be verified by the server, the server may return a code scanning failure message to the code scanning client, and stop using the static two-dimensional code information to deduct money, so the security of applying two-dimensional code information is ensured.

In this embodiment, the two-dimensional code scanning client obtains the static two-dimensional code information and the random feature value by scanning the combinational two-dimensional code. The random feature value can be obtained based on the dynamic feature information. The two-dimensional code scanning client can request the server to verify whether the scanned combinational two-dimensional code is valid based on the random feature value. If the two-dimensional code is valid, the static two-dimensional code information can be used. As such, the security of using the static two-dimensional code information can be improved.

Figure 6:
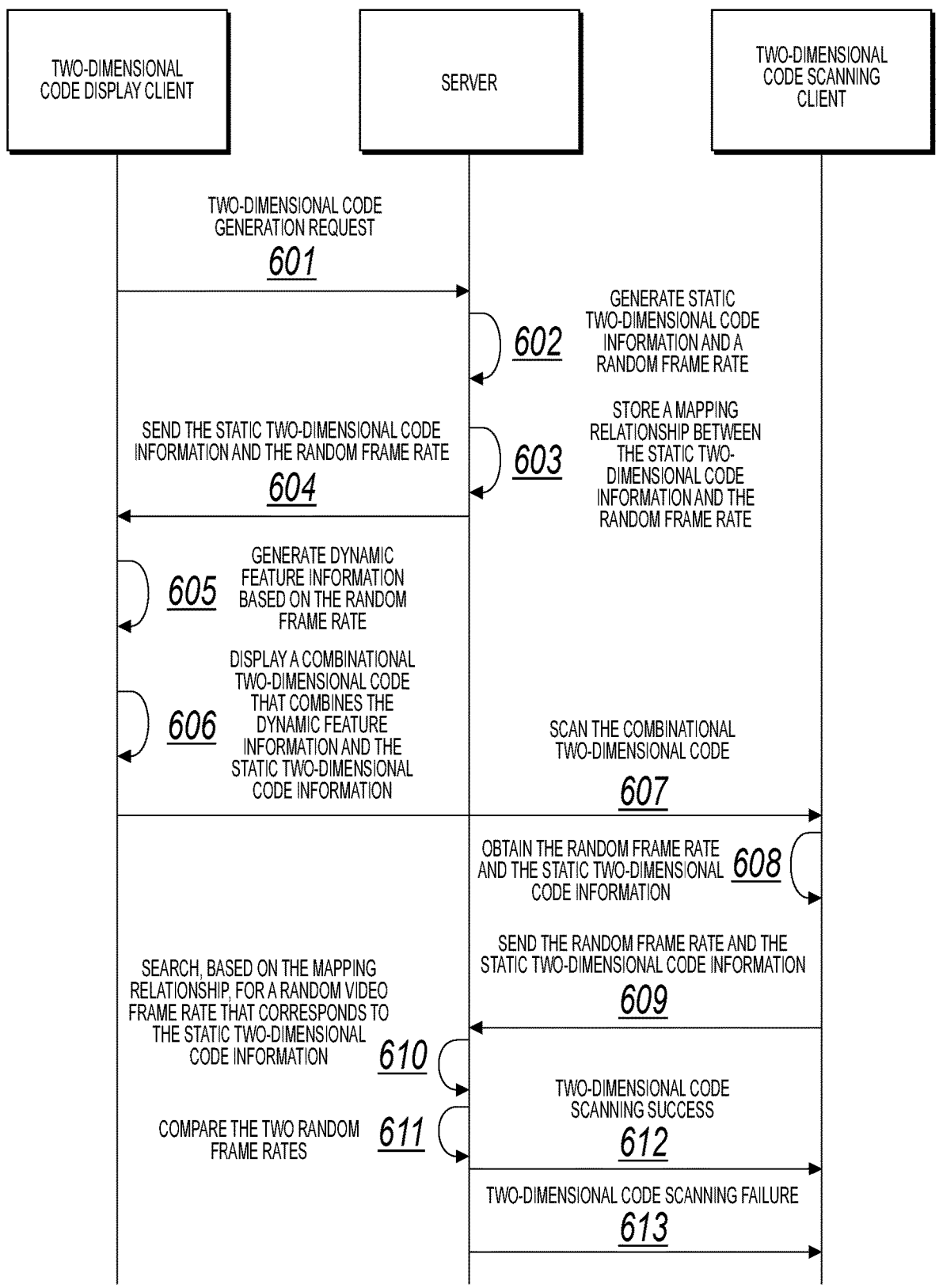
FIG. 6 is a flowchart illustrating yet another example of a two-dimensional code processing method, according to an embodiment of the present application.

The following description uses a combinational two-dimensional code for payment as an example, where a video frame rate is assumed to be the feature value randomly generated by a server. Referring to an embodiment in FIG. 6, the method can include the following steps. Steps described in the previously mentioned method embodiments will be briefly described in this embodiment. Details can be referred to in the embodiments in FIG. 2 to FIG. 5.

Step 601: A two-dimensional code display client sends a two-dimensional code generation request to a server, where the two-dimensional code generation request includes a user identifier.

For example, the two-dimensional code display client can be client software installed on a user's smartphone. The user can place a purchase order by using the software and tap a "generate a two-dimensional code" option on the client, triggering the client to send a two-dimensional code generation request to the server. The user identifier carried in the request can be, for example, an account used by the user to log into the client.

Step 602: The server generates static two-dimensional code information based on the user identifier of the two-dimensional code display client and generates a random frame rate.

For example, in this step, a server can generate the static two-dimensional code information by using the current two-dimensional code generation technology. The static two-dimensional code information is an identifier of a user identity. In this embodiment, the server further generates the random frame rate. For example, after using a random algorithm to generate a random number, that number can be used as a random frame rate to limit the video displayed by the two-dimensional code display client.

Step 603: The server stores a mapping relationship between the random frame rate and the static two-dimensional code information.

For example, the server can store the mapping relationship between the static two-dimensional code information and the random frame rate in this step, to search, based on the mapping relationship in a subsequent step, a frame rate that corresponds to a specific static two-dimensional code.

Step 604: The server sends the static two-dimensional code information and the random frame rate to the two-dimensional code display client.

Step 605: The two-dimensional code display client parses the combinational two-dimensional code to obtain the static two-dimensional code information and generates dynamic feature information based on the random frame rate.

For example, in this step, based on the random frame rate, the two-dimensional code display client can set the random frame rate as the frame rate of a video locally stored on the two-dimensional code display client. The video played based on the random frame rate is the dynamic feature information. In this step, the two-dimensional code display client further parses the combinational two-dimensional code to obtain the static two-dimensional code information.

Step 606: The two-dimensional code display client displays a combinational two-dimensional code that combines the dynamic feature information and a static two-dimensional code.

For example, for a form of the combinational two-dimensional code, refer to the example in FIG. 3. The static two-dimensional code carries information about the user identifier, and the dynamic feature information is the video displayed based on the random frame rate generated by the server.

Step 607: A two-dimensional code scanning client scans the combinational two-dimensional code displayed on the two-dimensional code display client.

For example, in this step, the two-dimensional code scanning client scans the combinational two-dimensional code at two different time points. The two-dimensional code scanning client scans a video at a first time point to obtain a first video frame image and scans that video at a second time point to obtain a second video frame image.

Step 608: The two-dimensional code scanning client parses the combinational two-dimensional code to obtain the static two-dimensional code information generated based on the user identifier of the two-dimensional code display client and obtains a random feature value by performing calculation based on the dynamic feature information.

For example, the two-dimensional code scanning client can not only parse the combinational two-dimensional code to obtain the static two-dimensional code information, but also calculate the frame rate based on the information obtained by means of code scanning in step 607. For example, based on the first and second time points, a time difference between them can be calculated. In addition, frame identifiers that correspond to the first and the second video frame images can be obtained, so does a frame difference between the two images. As a result, the quantity of video frames played in a time period between the first and second time points can be obtained. As such, the random frame rate can be obtained.

The respective frame identifiers that correspond to the first video frame image and the second video frame image can be obtained in multiple implementations. For example, the two-dimensional code display client adds a frame identifier (for example, a third frame) of a video frame to the frame when displaying the combinational two-dimensional code. Alternatively, an original video which is the same as the one on the two-dimensional code display client can be stored on the two-dimensional code scanning client, and when a video frame image is obtained by means of code scanning, a frame identifier of the image can be queried based on the original video.

Step 609: The two-dimensional code scanning client sends the random feature value and the static two-dimensional code information to the server to request the server to verify the random feature value.

In this step, the server receives a two-dimensional code verification request sent by the two-dimensional code scanning client. The two-dimensional code verification request includes the random feature value, such as the random frame rate of the video obtained in step 608, and the static two-dimensional code information obtained by parsing the scanned combinational two-dimensional code by the two-dimensional code scanning client.

Step 610: The server obtains a corresponding random feature value based on the static two-dimensional code information and the mapping relationship.

For example, based on the stored mapping relationship, the server can search based on for a random frame rate corresponding to the static two-dimensional code information, that is, search for a specific random frame rate allocated to the user corresponding to the static two-dimensional code information in step 602.

Step 611: The server compares the random feature value corresponding to the static two-dimensional code with the random feature value obtained based on the dynamic feature information.

For example, the server can compare the allocated random frame rate with the video frame rate calculated by the two-dimensional code scanning client based on the dynamic feature information. If both are the same, step 612 is performed. Otherwise, step 613 is performed.

Step 612: The server returns a two-dimensional code scanning success notification to the two-dimensional code scanning client and starts to use the static two-dimensional code information to deduct money.

Step 613: The server returns a two-dimensional code scanning failure message to the two-dimensional code scanning client, and stops using the static two-dimensional code information to deduct money.

In this embodiment, the server generates the static two-dimensional code information and the random feature value, so that the two-dimensional code display client can display the combinational two-dimensional code based on the information. In this way, the security of the combinational two-dimensional code is improved, so the two-dimensional code information leakage caused by a method such as copying or photographing can be avoided.

Figure 7:
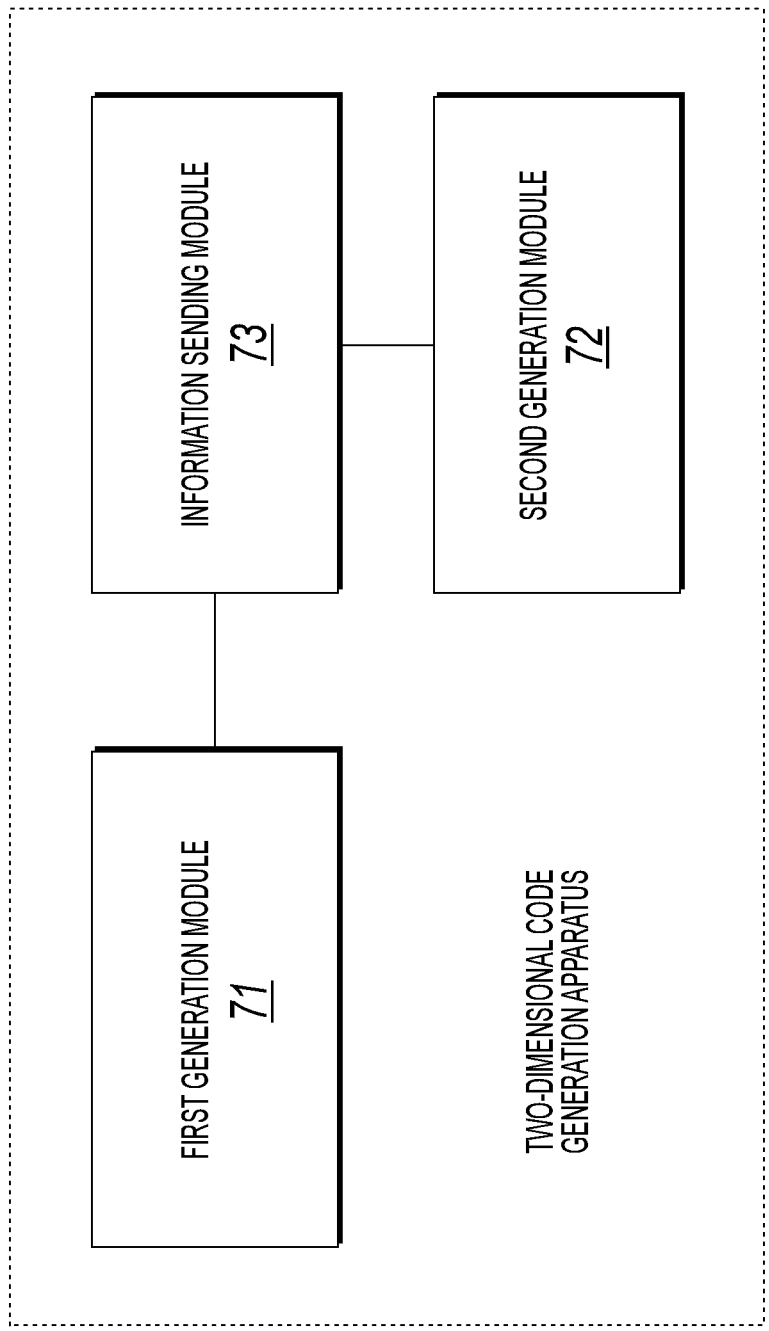
FIG. 7 is a structural diagram illustrating an example of a two-dimensional code processing apparatus, according to an embodiment of the present application.

The present application further provides a two-dimensional code processing apparatus to implement the two-dimensional code processing method. FIG. 7 is a structural diagram illustrating an example of a two-dimensional code processing apparatus, according to an embodiment of the present application. As shown in FIG. 7, the apparatus can include a first generation module 71, a second generation module 72, and an information sending module 73.

The first generation module 71 is configured to after a two-dimensional code generation request sent by a two-dimensional code display client is received, generates static two-dimensional code information based on a user identifier carried in the two-dimensional code generation request.

The second generation module 72 is configured to generate a random feature value. The random feature value is used to limit a display feature of dynamic feature information displayed by the two-dimensional code display client.

The information sending module 73 is configured to send the static two-dimensional code information and the random feature value to the two-dimensional code display client, so the two-dimensional code display client can display a combinational two-dimensional code, and the displayed combinational two-dimensional code includes the static two-dimensional code information and the dynamic feature information displayed based on the random feature value.

For example, the random feature value is a frame rate of the dynamic feature information displayed by the two-dimensional code display client. For example, the dynamic feature information can be a video.

Figure 8:
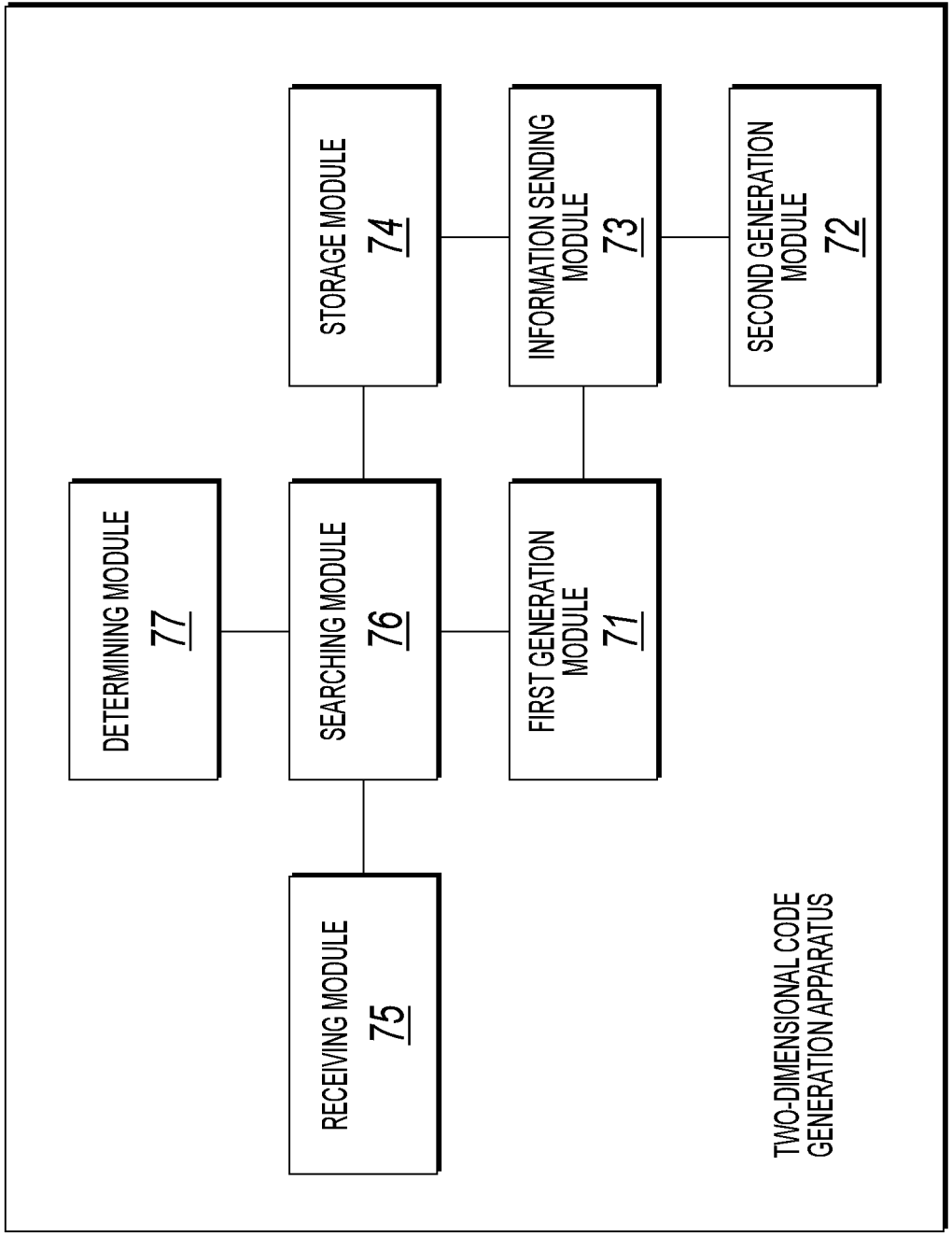
FIG. 8 is a structural diagram illustrating another example of a two-dimensional code processing apparatus, according to an embodiment of the present application.

FIG. 8 is a structural diagram illustrating another example of a two-dimensional code processing apparatus, according to an embodiment of the present application. Based on a structure shown in FIG. 7, the apparatus can further include a storage module 74, a receiving module 75, a searching module 76, and a determining module 77.

The storage module 74 is configured to store a mapping relationship between the random feature value and the static two-dimensional code information.

The receiving module 75 is configured to receive a two-dimensional code verification request sent by a two-dimensional code scanning client. The two-dimensional code verification request includes the static two-dimensional code information obtained by parsing the scanned combinational two-dimensional code by the two-dimensional code scanning client and the random feature value obtained by performing calculation based on the dynamic feature information.

The searching module 76 is configured to obtain a random feature value that corresponds to the static two-dimensional code information.

The determining module 77 is configured to return a two-dimensional code scanning success message to the two-dimensional code scanning client when the random feature value obtained based on the dynamic feature information is the same as the random feature value that corresponds to the static two-dimensional code information.

Figure 9:
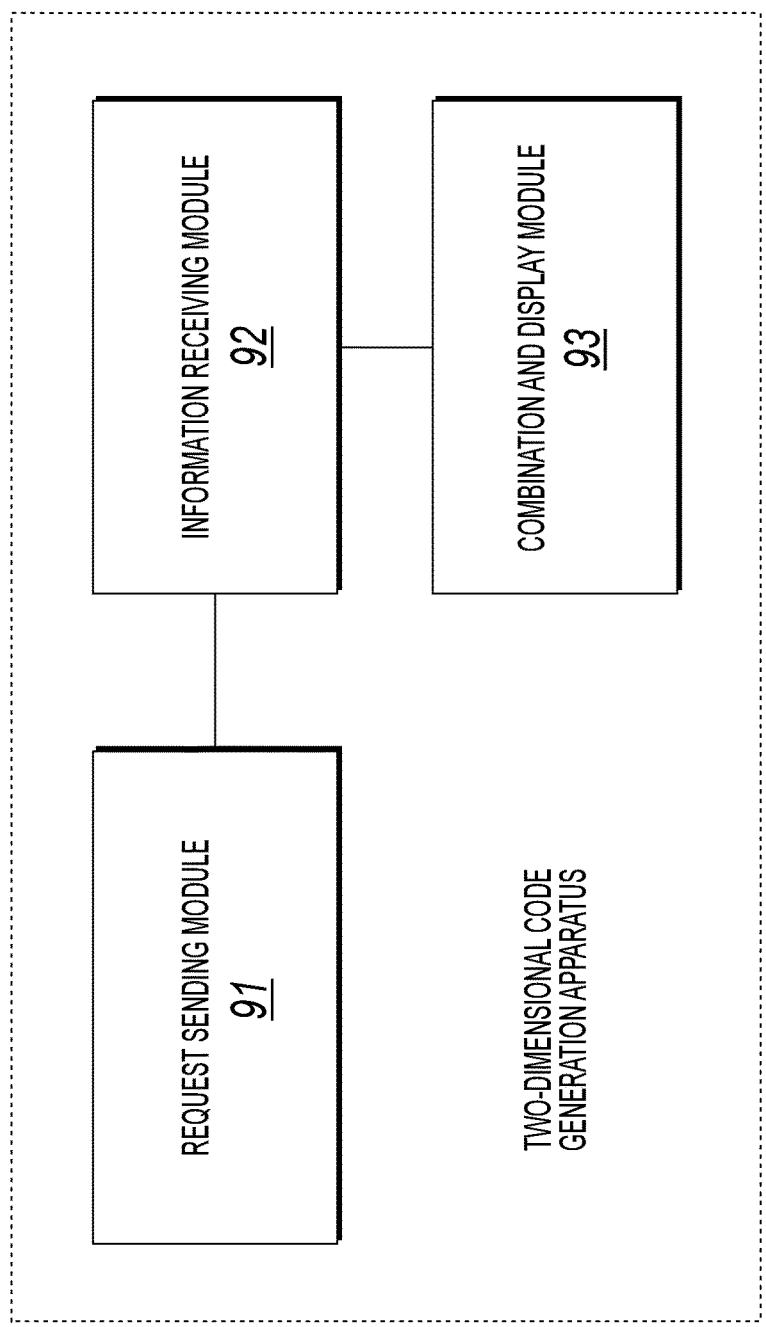
FIG. 9 is a structural diagram illustrating yet another example of a two-dimensional code processing apparatus, according to an embodiment of the present application.

FIG. 9 is a structural diagram illustrating yet another example of a two-dimensional code processing apparatus, according to an embodiment of the present application. As shown in FIG. 9, the apparatus can include a request sending module 91, an information receiving module 92, and a combination and display module 93.

The request sending module 91 is configured to send a two-dimensional code generation request to a server. The two-dimensional code generation request carries a user identifier.

The information receiving module 92 is configured to receive a combinational two-dimensional code returned by the server. The combinational two-dimensional code includes a random feature value generated by the server, and static two-dimensional code information generated by the server based on the user identifier.

The combination and display module 93 is configured to: generate dynamic feature information based on the random feature value, combine the dynamic feature information and a static two-dimensional code to form a combinational two-dimensional code, and display the combinational two-dimensional code.

Figure 10:
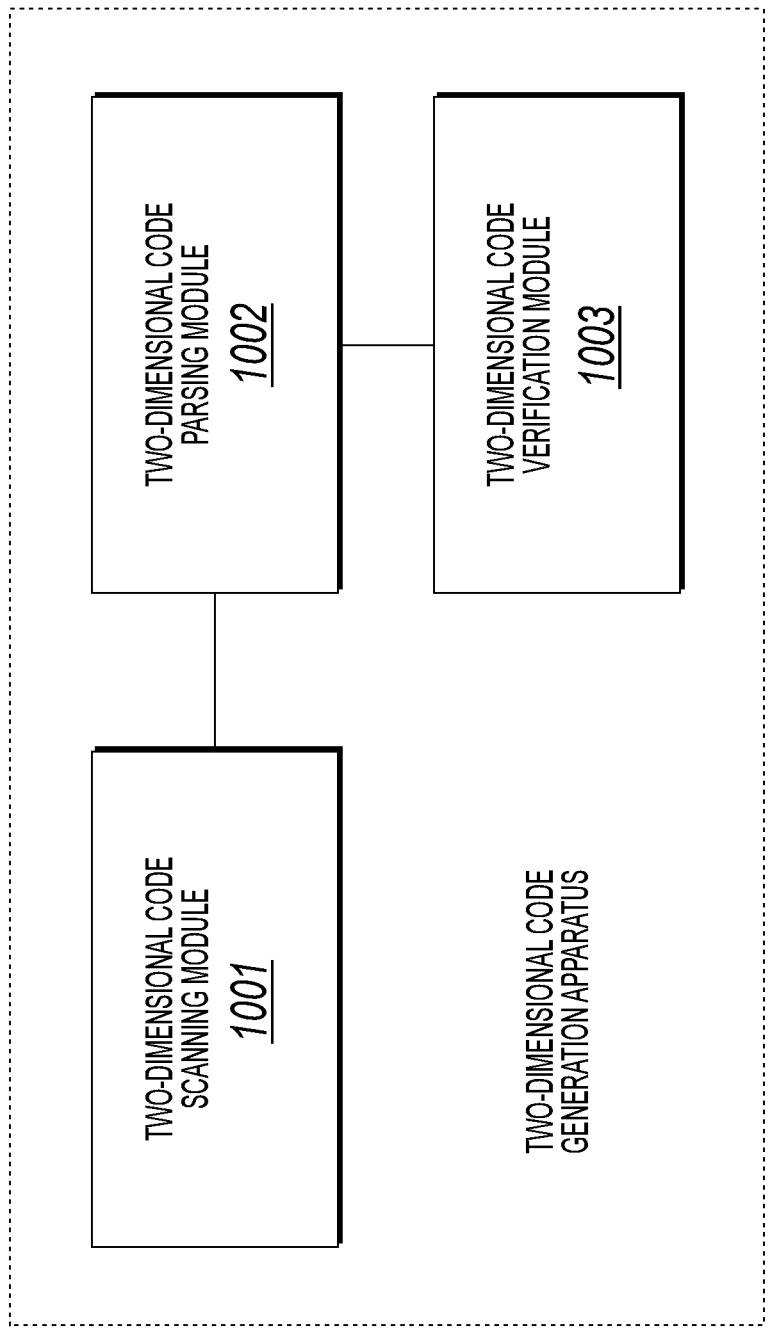
FIG. 10 is a structural diagram illustrating yet another example of a two-dimensional code processing apparatus, according to an embodiment of the present application.

FIG. 10 is a structural diagram illustrating yet another example of a two-dimensional code processing apparatus, according to an embodiment of the present application. As shown in FIG. 10, the apparatus can include a two-dimensional code scanning module 1001, a two-dimensional code parsing module 1002, and a two-dimensional code verification module 1003.

The two-dimensional code scanning module 1001 is configured to scan a combinational two-dimensional code displayed on a two-dimensional code display client. The combinational two-dimensional code includes dynamic feature information and static two-dimensional code information that is generated based on a user identifier of the two-dimensional code display client.

The two-dimensional code parsing module 1002 is configured to parse the combinational two-dimensional code to obtain the static two-dimensional code information and obtain a random feature value by performing calculation based on the dynamic feature information.

The two-dimensional code verification module 1003 is configured to send the random feature value and the static two-dimensional code information to a server to request the server to verify the random feature value.

Further, the dynamic feature information can be a video. The random feature value of the dynamic feature information can be a frame rate of the video.

The two-dimensional code scanning module 1001 is configured to: scan a video at a first time point to obtain a first video frame image and scan the video at a second time point to obtain a second video frame image.

The two-dimensional code parsing module 1002 is configured to obtain a frame rate of the video by performing calculation based on a time difference between the first time point and the second time point and respective frame identifiers corresponding to the first video frame image and the second video frame image.

In this embodiment, the server generates the static two-dimensional code information and the random feature value, so that the two-dimensional code display client can display the combinational two-dimensional code based on the information. As such, the security of the combinational two-dimensional code can be improved, and the two-dimensional code information leakage caused by copying or photographing can be avoided.

The foregoing descriptions are merely examples of the embodiments of the present application, and are not intended to limit the present application. Any modification, equivalent replacement, or improvement made without departing from the spirit and principle of the present application shall fall within the protection scope of the present application.

Figure 11:
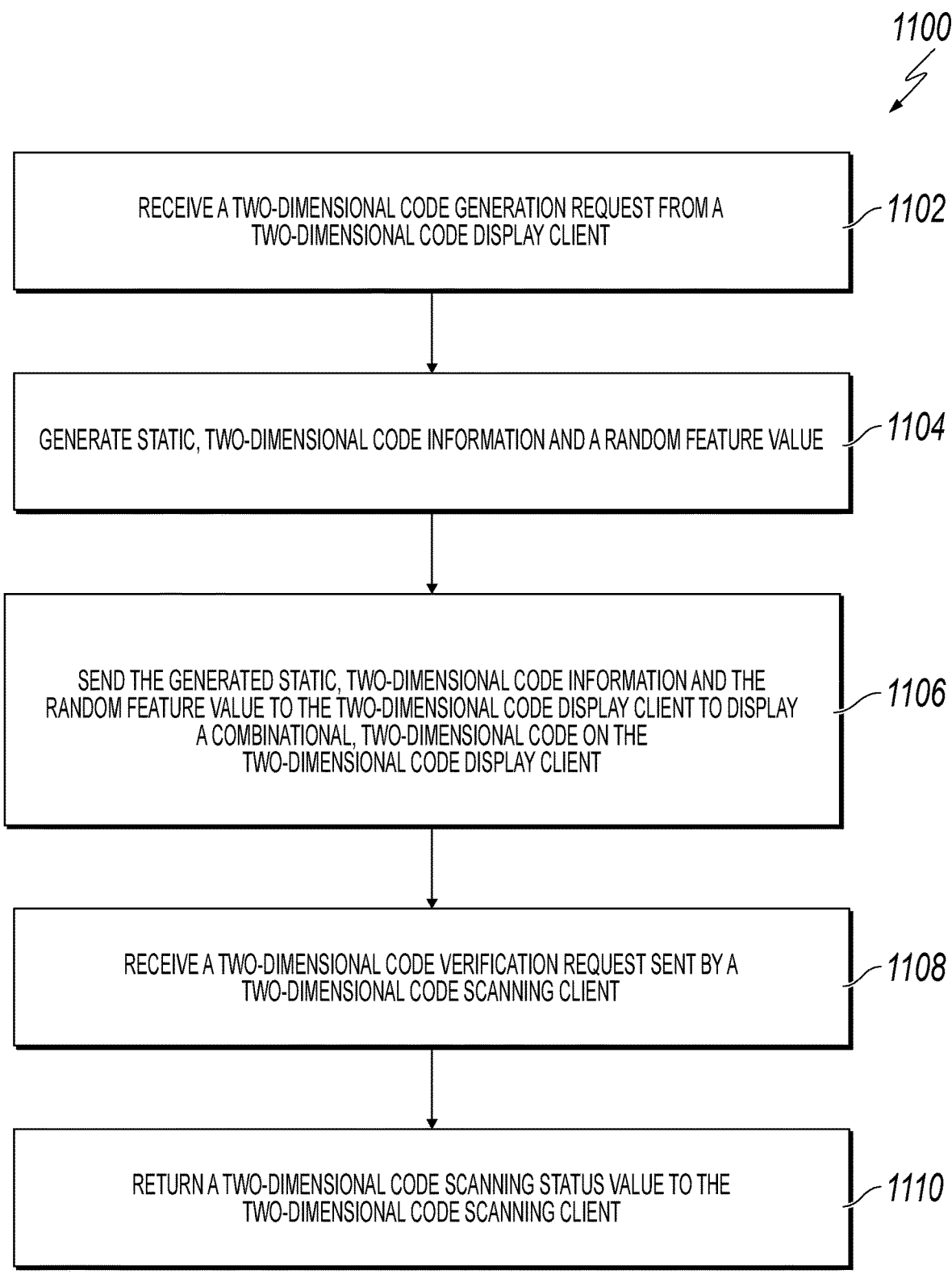
FIG. 11 is a flowchart illustrating an example of a computer-implemented method for two-dimensional code processing, according to an implementation of the present disclosure.

FIG. 11 is a flowchart illustrating an example of a computer-implemented method 1100 for two-dimensional code processing, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a two-dimensional code generation request is received by a server from a two-dimensional code display client. From 1102, method 1100 proceeds to 1104.

At 1104, static, two-dimensional code information and a random feature value are generated by the server. In some implementations, the static, two-dimensional code information is based on a user identifier associated with the received two-dimensional code generation request, and wherein the random feature value is used to limit a display feature of dynamic feature information displayed by the two-dimensional code display client. In some implementation, a mapping relationship between the static, two-dimensional code information and the random feature value is stored. From 1104, method 1100 proceeds to 1106.

At 1106, the generated static, two-dimensional code information and the random feature value are sent by the server to the two-dimensional code display client to display a combinational, two-dimensional code on the two-dimensional code display client. The combinational, two-dimensional code comprises the static, two-dimensional code information and generated dynamic feature information based on the random feature value. From 1106, method 1100 proceeds to 1108.

At 1108, a two-dimensional code verification request sent by a two-dimensional code scanning client is received by the server. In some implementations, a graphical user interface of the described two-dimensional code display client and two-dimensional code scanning client can be analyzed to ensure that that a scanning operation (for example, a two-dimensional code scanning interface) can be positioned on graphical user interfaces to be least obtrusive for a user (for example, to obscure the least amount of data and to avoid covering any critical or often-used graphical user interface elements).

The received two-dimensional code verification request comprises the static, two-dimensional code information and the random feature value, and wherein the static, two-dimensional code information and the random feature value is obtained by the two-dimensional code scanning client scanning and parsing the displayed combinational, two-dimensional code. A random feature value corresponding to the received static, two-dimensional code information is obtained by the server. The random feature value obtained by the server is compared with the received random feature value to generate a comparison result indicating a match or a non-match. From 1108, method 1100 proceeds to 1110.

At 1110, the comparison result is sent to the two-dimensional code scanning client. In some implementations, a graphical user interface of the described two-dimensional code scanning client can be analyzed to ensure that that a verification interface (for example, a dialog) can be positioned on graphical user interfaces to be least obtrusive for a user (for example, to obscure the least amount of data and to avoid covering any critical or often-used graphical user interface elements). The returned comparison result is success if indicating a match and failure if indicating a non-match. After 1110, method 1100 stops.

Implementations of the subject matter described in this specification can be implemented so as to realize particular advantages or technical effects. For example, implementations of the subject matter permit a request for a two-dimensional code from a code display client to be made to a server. The server receives the request and generates the requested two-dimensional code for display on a two-dimensional code display client. The generated two-dimensional code can be scanned from the two-dimensional code display client through user interaction (for example, a touch or swipe interaction) with a graphical user interface of a two-dimensional code scanning client. The server provides a verification of the validity of the scanned two-dimensional code. The validity result can be displayed on a graphical user interface of the two-dimensional code scanning client. Based on the validity determination, a determination of whether to perform subsequent actions (for example, using the two-dimensional code scanning client to complete a transaction, transmit data, or store information) can be made.

The described methodology permits enhancement of various mobile computing device transactions and overall transaction/data security. Participants in transactions using mobile computing devices can be confident that two-dimensional codes scanned with a client mobile computing device are valid and that they will not be victims of fraud.

Information embedded in generated two-dimensional codes can result in random/dynamic actions or change over time. This feature permits higher-level security of underlying data and transactions, as committing fraud using illegitimate two-dimensional codes becomes extremely difficult or impossible with random/dynamic or time-based information. For example, information embedded in a two-dimensional code can include a random/dynamically played video or audio or a series of random/dynamically played images.

The described methodology can ensure the efficient usage of computer resources (for example, processing cycles, network bandwidth, and memory usage), through the efficient verification of data/transactions. At least these actions can minimize or prevent waste of available computer resources with respect to multiple parties in a mobile computing transactions by preventing undesired/fraudulent transactions. Instead of users needing to verify data with additional research or transactions, transactions can be depended upon as valid.

In some implementations, a graphical user interface of the described two-dimensional code display client and two-dimensional code scanning client can be analyzed to ensure that that scanning and verification operations (for example, a two-dimensional code scanning interface and verification notification interface) can be positioned on graphical user interfaces to be least obtrusive for a user (for example, to obscure the least amount of data and to avoid covering any critical or often-used graphical user interface elements).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a server, information corresponding to a combinational two-dimensional code that includes static two-dimensional code information and a random feature value, the random feature value based upon dynamic feature information obtained from the combinational two-dimensional code at a first time and a second time subsequent to the first time;
   identifying, by the server, a stored random feature value stored by the server that corresponds to the received static two-dimensional code information;
   determining, by the server, whether the received random feature value is the same as the stored random feature value; and
   in response to determining that the received random feature value is the same as the stored random feature value, sending, by the server, a code scanning success notification.

2. The computer-implemented method of claim 1, wherein the static two-dimensional code information is based on a user identifier associated with the combinational two-dimensional code.

3. The computer-implemented method of claim 1, wherein the dynamic feature information includes a first video frame image at the first time and a second video frame image at the second time.

4. The computer-implemented method of claim 3, wherein the received random feature value includes a video frame rate based upon the first video frame image at the first time and the second video frame image at the second time, and the stored random feature value includes a stored video frame rate.

5. The computer-implemented method of claim 4, wherein determining whether the received random feature value is the same as the stored random feature value comprises:
   comparing the video frame rate of the received random feature value and the stored video frame rate; and
   in response to comparing the video frame rate of the received random feature value and the stored video frame rate, generating the code scanning success notification.

6. The computer-implemented method of claim 1, further comprising storing, by the server, a mapping relationship between the static two-dimensional code information and the stored random feature value.

7. The computer-implemented method of claim 1, further comprising in response to determining that the received random feature value is not the same as the stored random feature value, sending, by the server, a code scanning failure notification.

8. A non-transitory, computer-readable medium storing one or more instructions executable by a computer system to perform operations comprising:
   receiving, by a server, information corresponding to a combinational two-dimensional code that includes static two-dimensional code information and a random feature value, the random feature value based upon dynamic feature information obtained from the combinational two-dimensional code at a first time and a second time subsequent to the first time;
   identifying, by the server, a stored random feature value stored by the server that corresponds to the received static two-dimensional code information;
   determining, by the server, whether the received random feature value is the same as the stored random feature value; and
   in response to determining that the received random feature value is the same as the stored random feature value, sending, by the server, a code scanning success notification.

9. The non-transitory, computer-readable medium of claim 8, wherein the static two-dimensional code information is based on a user identifier associated with the combinational two-dimensional code.

10. The non-transitory, computer-readable medium of claim 8, wherein the dynamic feature information includes a first video frame image at the first time and a second video frame image at the second time.

11. The non-transitory, computer-readable medium of claim 10, wherein the received random feature value includes a video frame rate based upon the first video frame image at the first time and the second video frame image at the second time, and the stored random feature value includes a stored video frame rate.

12. The non-transitory, computer-readable medium of claim 11, wherein determining whether the received random feature value is the same as the stored random feature value comprises operations of:

comparing the video frame rate of the received random feature value and the stored video frame rate; and in response to comparing the video frame rate of the received random feature value and the stored video frame rate, generating the code scanning success notification.

13. The non-transitory, computer-readable medium of claim 8, further comprising one or more operations including storing, by the server, a mapping relationship between the static two-dimensional code information and the stored random feature value.

14. The non-transitory, computer-readable medium of claim 8, further comprising one or more operations including, in response to determining that the received random feature value is not the same as the stored random feature value, sending a code scanning failure notification.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  receiving information corresponding to a combinational two-dimensional code that includes static two-dimensional code information and a random feature value, the random feature value based upon dynamic feature information obtained from the combinational two-dimensional code at a first time and a second time subsequent to the first time;
  identifying a stored random feature value that corresponds to the received static two-dimensional code information;
  determining whether the received random feature value is the same as the stored random feature value; and
  in response to determining that the received random feature value is the same as the stored random feature value, sending a code scanning success notification.

16. The computer-implemented system of claim 15, wherein the static two-dimensional code information is based on a user identifier associated with the combinational two-dimensional code.

17. The computer-implemented system of claim 15, wherein the dynamic feature information includes a first video frame image at the first time and a second video frame image at the second time.

18. The computer-implemented system of claim 17, wherein the received random feature value includes a video frame rate based upon the first video frame image at the first time and the second video frame image at the second time, and the stored random feature value includes a stored video frame rate.

19. The computer-implemented system of claim 18, wherein determining whether the received random feature value is the same as the stored random feature value comprises instructions for:
  comparing the video frame rate of the received random feature value and the stored video frame rate; and
  in response to comparing the video frame rate of the received random feature value and the stored video frame rate, generating the code scanning success notification.

20. The computer-implemented system of claim 15, further comprising one or more instructions for storing a mapping relationship between the static two-dimensional code information and the stored random feature value.

* * * * *